(12) United States Patent
Konanur et al.

(10) Patent No.: US 9,660,704 B2
(45) Date of Patent: May 23, 2017

(54) TRANSMITTING MAGNETIC FIELD THROUGH METAL CHASSIS USING FRACTAL SURFACES

(71) Applicant: Intel Corporation, Santa Clara, CA (US)

(72) Inventors: Anand S. Konanur, Sunnyvale, CA (US); Ulun Karacaoglu, San Diego, CA (US); Songnan Yang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/981,618

(22) Filed: Dec. 28, 2015

(65) Prior Publication Data

US 2016/0218777 A1 Jul. 28, 2016

Related U.S. Application Data

(63) Continuation of application No. 13/678,926, filed on Nov. 16, 2012, now Pat. No. 9,225,388.

(51) Int. Cl.
*H04B 7/00* (2006.01)
*H04B 5/00* (2006.01)
*H01Q 1/22* (2006.01)
*H01Q 1/52* (2006.01)
*H01Q 7/00* (2006.01)

(52) U.S. Cl.
CPC ......... *H04B 5/0081* (2013.01); *H01Q 1/2266* (2013.01); *H01Q 1/52* (2013.01); *H01Q 1/528* (2013.01); *H01Q 7/00* (2013.01); *H04B 5/00* (2013.01)

(58) Field of Classification Search
CPC ............................... H04B 5/00; H04B 5/0035
USPC ............. 455/41.1, 41.2, 39, 575.7; 340/10.1, 340/10.3; 343/700 R, 702, 841
See application file for complete search history.

(56) References Cited

U.S. PATENT DOCUMENTS 8,798,535 B2 * 8/2014 Charrat ............ G06K 19/07771
455/41.1
9,000,619 B2 4/2015 Kato et al.
(Continued)

FOREIGN PATENT DOCUMENTS

CN 1559093 A 12/2004
CN 101098040 A 1/2008
(Continued)

OTHER PUBLICATIONS

Office Action received for Chinese Patent Application No. 201380029182.9, mailed on Jul. 1, 2016, 29 pages of Chinese Office Action including 17 pages of English Translation.
(Continued)

*Primary Examiner* — Sonny Trinh
(74) *Attorney, Agent, or Firm* — Forefront IP Lawgroup of Christie & Rivera PLLC

(57) ABSTRACT

Described herein are techniques related one or more systems, apparatuses, methods, etc. for reducing induced currents in a apparatus chassis. For example, a fractal slot is constructed in the apparatus chassis to reduce the induced currents, and enhance passage of magnetic fields through the apparatus chassis. In this example, the fractal slot may include a no-self loop fractal space filling curve shape to provide high impedance to the induced currents.

18 Claims, 9 Drawing Sheets

(56) References Cited

U.S. PATENT DOCUMENTS

| | | | |
|---|---|---|---|
| 9,065,182 B2 | 6/2015 | Kato et al. | |
| 9,225,064 B2 | 12/2015 | Gouchi et al. | |
| 9,306,628 B2 | 4/2016 | Konanur et al. | |
| 2006/0170604 A1* | 8/2006 | Almog | H01Q 1/38 343/795 |
| 2007/0026826 A1* | 2/2007 | Wilson | G06K 19/0723 455/130 |
| 2008/0265038 A1* | 10/2008 | Mumbru Forn | H01Q 1/36 235/492 |
| 2009/0109101 A1* | 4/2009 | Baliarda | H01Q 1/36 343/702 |
| 2009/0153412 A1 | 6/2009 | Chiang et al. | |
| 2009/0207087 A1* | 8/2009 | Fang | H01Q 1/243 343/795 |
| 2010/0220029 A1 | 9/2010 | Cohen | |
| 2011/0050164 A1 | 3/2011 | Partovi et al. | |
| 2011/0278947 A1 | 11/2011 | Hennig et al. | |
| 2012/0057322 A1 | 3/2012 | Waffenschmidt | |
| 2012/0071090 A1* | 3/2012 | Charrat | G06K 19/07771 455/41.1 |
| 2013/0335284 A1* | 12/2013 | Hsu | H01Q 7/08 343/788 |
| 2014/0002225 A1* | 1/2014 | Konanur | H04B 5/0081 336/200 |
| 2014/0002313 A1* | 1/2014 | Yang | H01Q 1/22 343/702 |
| 2016/0149289 A1 | 5/2016 | Lilja et al. | |

FOREIGN PATENT DOCUMENTS

| | | |
|---|---|---|
| EP | 1 699 110 A2 | 9/2006 |
| GB | 2471753 A | 1/2011 |
| JP | 2003-521146 A | 7/2003 |
| JP | 2005-503062 A | 1/2005 |
| JP | 2009-038722 A | 2/2009 |
| WO | 2011/127696 A1 | 10/2011 |
| WO | 2014/008057 A1 | 1/2014 |

OTHER PUBLICATIONS

Extended European Search Report received for European Patent Application No. 13813978.7, mailed on Jan. 8, 2016, 8 pages.

International Preliminary Report on Patentability and Written Opinion received for PCT Patent Application No. PCT/US2013/047794, mailed on Jan. 15, 2015, 9 pages.

International Search Report and Written Opinion received for PCT Patent Application No. PCT/US2013/047794, mailed on Sep. 27, 2013, 13 pages.

Prusinkiewicz, et al., "The Algorithmic Beauty of Plants", Springer-Verlag, 1990, 240 pages.

Office Action received for Japanes Patent Application No. 2015-520424, mailed on Mar. 29, 2016, 2 pages of English Translation and 2 pages of Japanese Office Action.

Extended European Search Report received for European Patent Application No. 13813978.7, mailed on Jan. 8, 2016 8 pages.

Extended European Search Report received for European Patent Application No. 16188797.1, mailed on Jan. 2, 2017, 9 pages.

Office Action received for Chinese Patent Application No. 201380029182.9, mailed on Mar. 1, 2017, 11 pages of Chinese Office Action only.

Atkins, Wendy, "The Smart Card Report", Elsevier Advanced Technology, 8th Edition, 2004.

Non-Final Office Action received for U.S. Appl. No. 15/264,524, mailed on Feb. 3, 2017, 11 pages.

\* cited by examiner

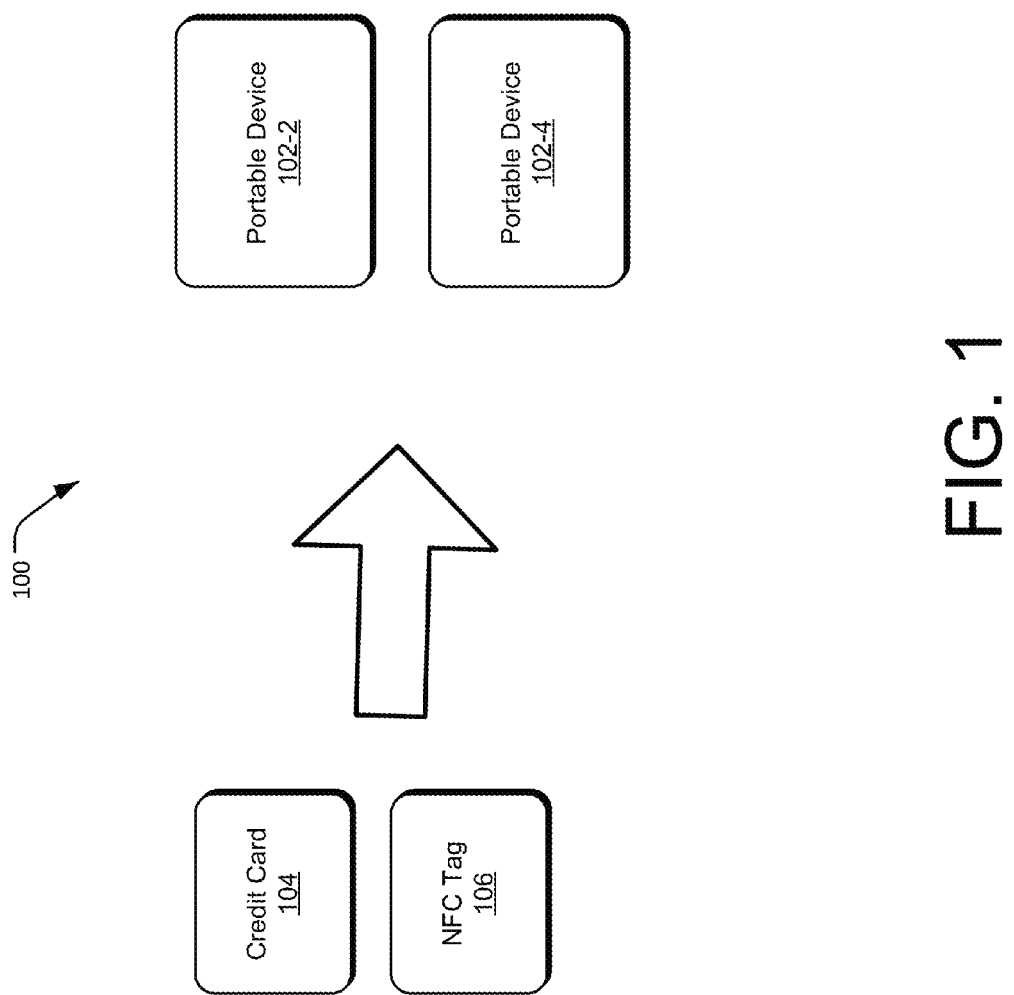

TRANSMITTING MAGNETIC FIELD THROUGH METAL CHASSIS USING FRACTAL SURFACES

RELATED APPLICATION

This application claims the benefit of priority of U.S. Provisional Patent Application Ser. No. 61/667,518 filed Jul. 3, 2012.

BACKGROUND

Recently, technologies have arisen that allow near field coupling (e.g., wireless power transfers (WPT) and near field communications (NFC)) between portable devices in close proximity to each other. Such near field coupling functions may use radio frequency (RF) antennas in the devices to transmit and receive electromagnetic signals. Because of user desires (and/or for esthetic reasons) many of these portable devices are small (and becoming smaller), and tend to have exaggerated aspect ratios when viewed from the side. As a result, many of these portable devices incorporate flat antennas, which use coils of conductive material as their radiating antennas for use in near field coupling functions.

For example, an NFC antenna integration in a plastic chassis portable device may be achieved by creating a cutout on a conductive electromagnetic interference (EMI) coating under a palm rest area of the portable device, such that the NFC antenna that is attached to the cutout area may radiate through the chassis effectively. For devices having a complete metallic chassis, the metallic chassis is often used to maintain mechanical strength in a thin design. The use of the metallic chassis creates a key challenge for NFC coil antenna integration into such devices (e.g., thin laptop computer such as Ultrabooks), since the NFC antenna needs a non-metallic surface in order to radiate through.

Accordingly, a solution allowing the NFC antenna to be integrated into a thin metallic chassis and maintain efficiency in the NFC antenna radiation is desired so that industrial design, mechanical integrity, and customer appeal may be preserved.

BRIEF DESCRIPTION OF THE DRAWINGS

FIG. 1 illustrates wireless devices in an example near field coupling arrangement.

Figure 2A:
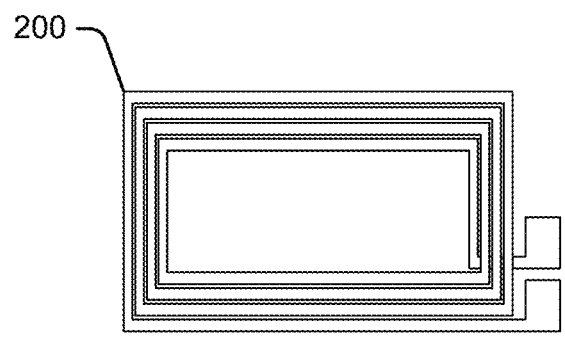
FIGS. 2A and 2B illustrate an example near field communications (NFC) coil antenna and top view of a keypad area in a wireless device, respectively.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for reducing induced currents in a wireless device chassis such as, in a palm rest of a full metal chassis portable device (e.g., Ultrabook). In an implementation, a near field communications (NFC) coil antenna may be integrated underneath the full metal chassis and conductive coating of the portable device. In this implementation, the full metal chassis together with the conductive coating may be configured to utilize a special slot pattern or design in reducing the current (e.g., Eddy current) that may be induced by electromagnetic fields radiated by the NFC coil antenna. For example, the special slot pattern or design may include at least one fractal slot or surface that adapts a no-self loop fractal space filling curve shape to minimize path or cut continuity of the Eddy current.

In an implementation, the fractal slot may provide high impedance to the Eddy current using its own unique configuration (i.e., no-self loop fractal space filling curve shape), or by adjusting slot width (e.g., one mm) to minimize coupling between the NFC coil antenna and the metallic chassis and/or the conductive coating. In this implementation, the minimized coupling may denote a minimized Eddy current. In another implementation, direction of sliced slots or segments in the fractal slot is configured to be perpendicular to an assumed direction of the Eddy current. Furthermore, the fractal slot may be designed to be frequency selective when the NFC coil antenna is used for wireless fidelity (WiFi) signals by adjusting the slot width and/or geometric pattern of the fractal slot.

In an implementation, the fractal slot is tiled to another fractal slot in providing the high impedance to the Eddy current. Furthermore, grounding each of the tiled fractal slots may increase electrostatic discharge (ESD) protection in the conductive coating or the portable device.

FIG. 1 illustrates an example arrangement 100 of portable devices for near field coupling. More particularly, users may have a desire to operate near field coupling enabled portable electronic devices and/or other devices in certain ergonomically convenient manners. Examples of such portable devices include, but are not limited to, ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

In an implementation, FIG. 1 shows two users (not shown) that operate their NFC-enabled portable devices 102-2 and 102-4 to perform NFC-related information sharing functions. For example, a front-to-back (not shown), or a back-to-back (not shown) manner may be performed for the NFC communication. In an implementation, the portable devices 102 may accept information from a credit card 104, a NFC tag 106 (or other similar device) through a NFC coil antenna (not shown). The portable devices 102 may require the NFC coil antenna (not shown) to be integrated in a palm rest (not shown) or in other areas of the portable devices 102. For example, the NFC coil antenna (not shown) may be integrated underneath a metal chassis of portable device 102, or the NFC coil antenna (not shown) may be integrated underneath conductive coating of the portable device 102. In this example, the portable devices 102 may accept information from a credit card 104 or NFC tag 106 through the NFC coil antenna (not shown).

FIG. 2A illustrates an example NFC coil antenna 200. In an implementation, the coil antenna 200 may include a continuous multiple loop of coil antenna that forms a rectangular ring shape. The continuous loop of coil antenna 200 may be mounted on, embedded in, or otherwise associated with a metallic chassis (not shown) or a conductive coating (not shown) of a plastic chassis device, such as portable device 102. The coil antenna 200 may include a dedicated antenna for NFC purposes. In other words, the coil antenna 200 may be configured to operate on a separate resonant frequency (e.g., 13.56 MHz to implement NFC operations), and independent from another antenna that uses standard frequencies used in wireless communications (e.g., 5 GHz for WiFi signals). In another implementation, the coil antenna 200 may be utilized for the WiFi signals that operate at 2.4 GHz or 5 GHz operating frequencies. The coil antenna 200 may be made out of a printed circuit board (PCB), a flexible printed circuit (FPC), a metal wire, created through a laser direct structuring (LDS) process, or directly embedded to the metallic chassis (not shown) and underneath a conductive coating (not shown) portable device 102.

Figure 2B:
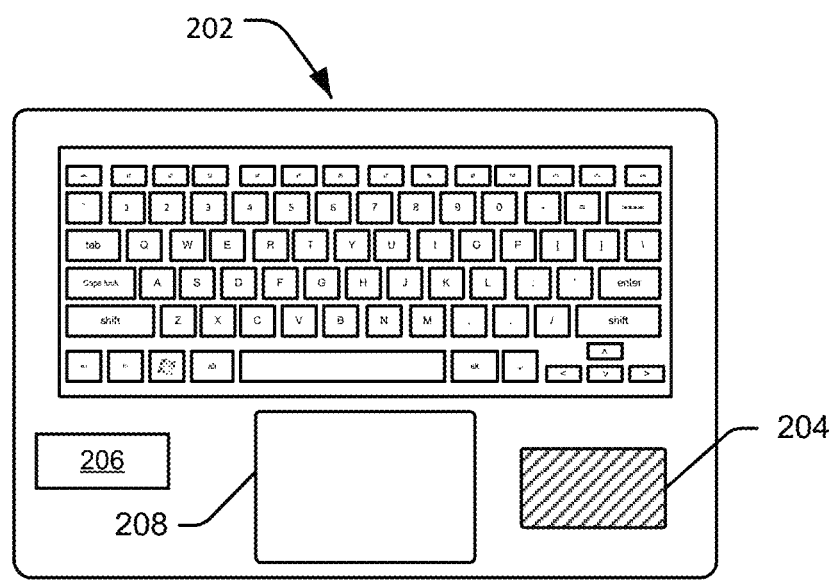

FIG. 2B illustrates a top view of a keypad area 202 of the portable device 102. In an implementation, the present embodiment may include a unique pattern and design of the conductive coating (not shown) that is associated with or located underneath chassis 204. In this implementation, the conductive coating may be associated with chassis 204. Chassis 204 may be plastic, metal, carbon fiber or another material. For example, in a full metallic chassis, the unique pattern and design may be implemented to extend from the conductive coating to the chassis 204 itself. In a full metallic chassis 204, the unique pattern and design may be implemented by providing slots in the metallic chassis 204. For plastic chassis 204, the unique pattern and design may extend to the conductive coating alone. Although chassis 204 is shown as a rectangular region within the device 200, it may extend beyond what is depicted in FIG. 2B. For instance, chassis 204 may encompasses the a greater portion or the entire device 200.

In an implementation, the unique pattern and design may include construction of a fractal slot (not shown) that is based or modeled from a no-self loop fractal space filling curve template (i.e., fractal curve template) such as Hilbert Curves (not shown). In this implementation, the fractal slot is constructed in the chassis 204 to allow the coil antenna 200 to perform NFC related functions or operate at WiFi signal operating frequencies. Furthermore, the fractal slot is constructed to cover an area that includes approximate extent of electromagnetic fields that induce Eddy current to the conductive coating.

In an implementation, an NFC module 206 may be integrated anywhere inside the keypad area 202 or in other areas such us, beside a trackpad area 208. The NFC module 206 may include transceiver circuitry that processes electrical signals in the coil antenna 200. For example, the NFC module 206 may be used to provide tuning to the coil antenna 200 for maximum power transfer during transmit or receive operations. In other implementations, the NFC module 206 may be integrated with the coil antenna 200 underneath the chassis 204 to form a single module.

Figure 3:
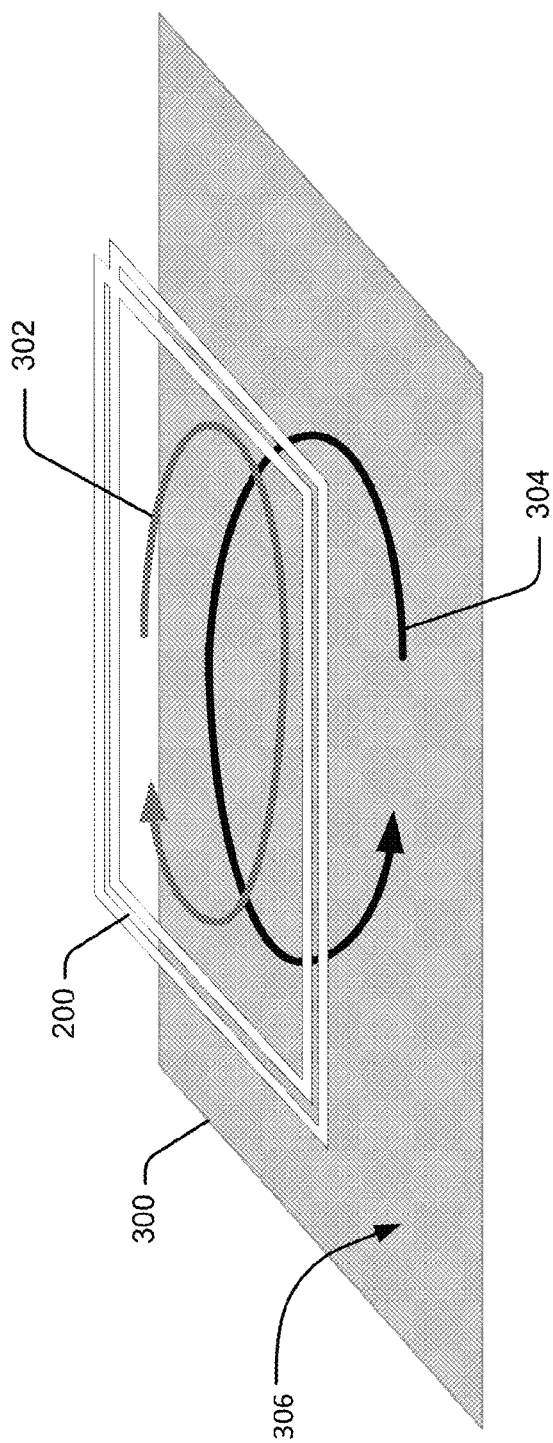
FIG. 3 illustrates an example underneath view of a coil antenna and a conductive surface of a conductive coating.

FIG. 3 illustrates an underneath view of the coil antenna 200 integration in the chassis 204. For example, the coil antenna 200 is placed underneath the full metal chassis 204 that includes an integrated or associated conductive coating 300. In this example, the integrated or associated conductive coating 300 is located between the coil antenna 200 and the chassis 204. FIG. 3 shows upside down illustration of this configuration (i.e., chassis 204 is placed at bottom, conductive coating 300 at middle, and coil antenna 200 at top).

With continuing reference to FIG. 3, when a current 302 is injected through the coil antenna 200, an electromagnetic field (not shown) may be generated around the coil antenna 200. In an implementation, the electromagnetic field may induce an Eddy current 304 in a conductive surface 306 of the conductive coating 300. In this implementation, the Eddy current 304 is flowing in opposite direction as against the direction of the injected current 302. As a result, the Eddy current 304 may generate a reactive magnetic field (not shown) that may partially cancel the electromagnetic field generated by the coil antenna 200. To this end, the NFC performance of the coil antenna 200 is significantly impacted. In other words, such as in a full metal chassis 204, impedance seen by the Eddy current 304 is approximately zero, and thus the induced Eddy current 304 magnitude is high. The higher the Eddy current 304, the lower NFC field strength is produced in the coil antenna 200.

Figure 4B:
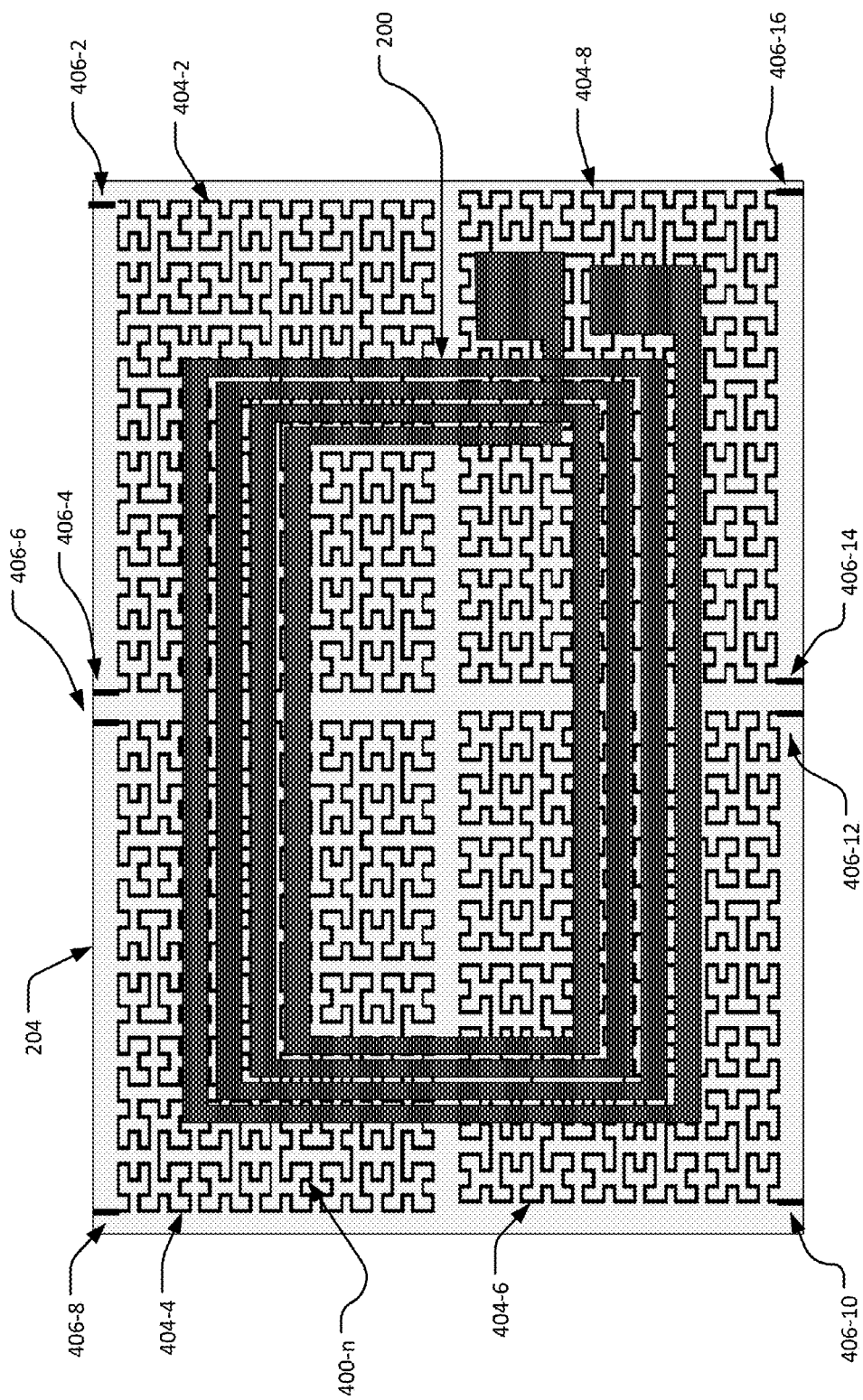
FIG. 4B illustrates an example fractal slot placed in different quadrants of an area of a near field communications (NFC) coil antenna.
Figure 4A:
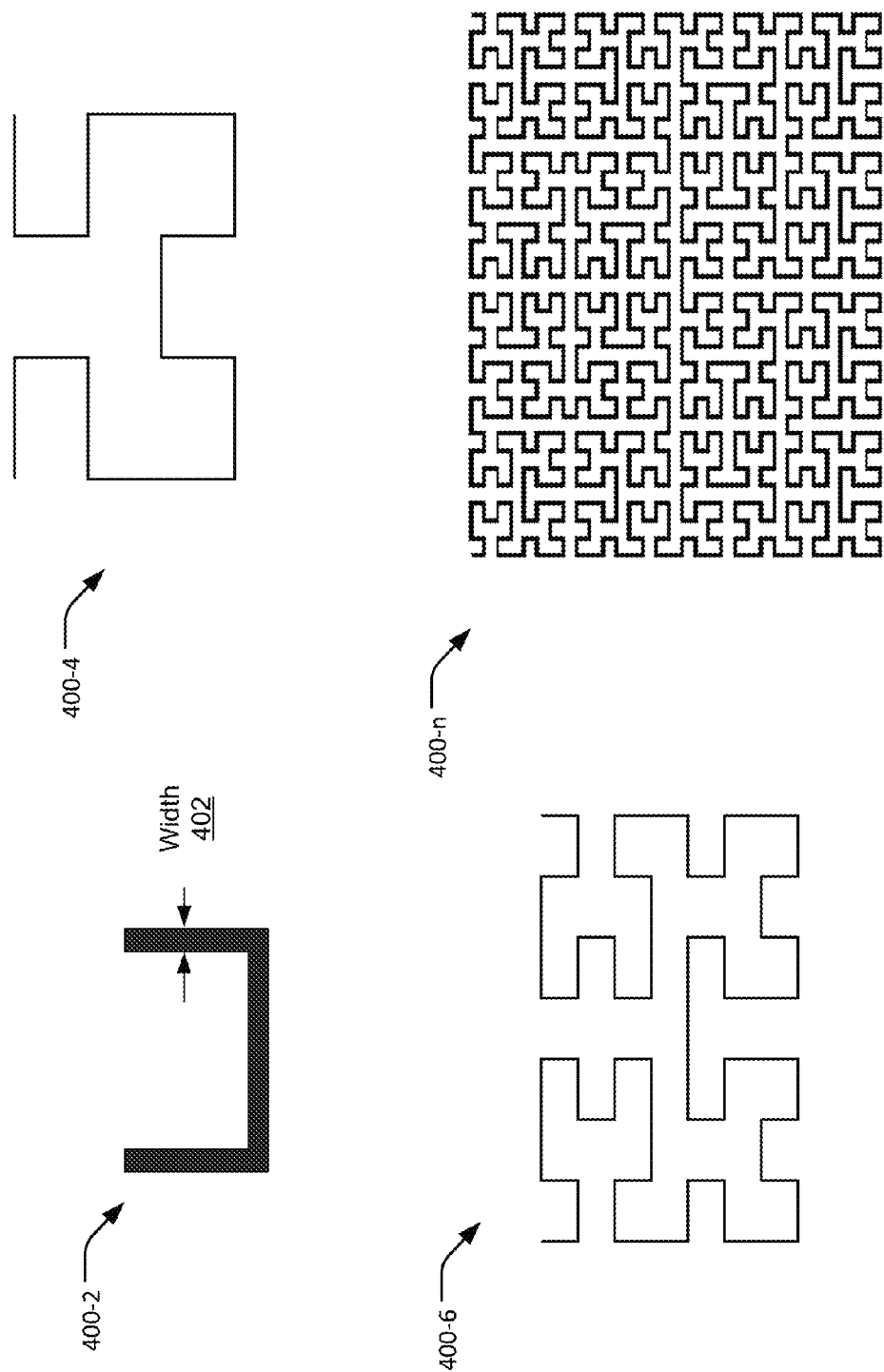
FIG. 4A illustrates an example first order, second order, etc. of a fractal curve that is used as a template for constructing a fractal slot in a conductive coating and a metallic chassis.

FIG. 4A illustrates an example fractal curve that is used as a template for constructing a fractal slot (not shown) in conductive coating and/or metallic chassis of the portable device 102. In an implementation, FIG. 4A shows example orders in building a fractal curve 400 that is ordinarily used to model highly complex or irregular objects. In current implementation, the object to be modeled is the rectangular coil antenna 200 or the approximate extent of electromagnetic fields that may be radiated by the coil antenna 200. In an implementation, the fractal curve 400 may include a continuous no-self loop fractal space filling curve (e.g., Hilbert Curve) to provide high impedance to the Eddy current 304. For example, the fractal curve 400 may provide a special slot pattern or design template to minimize coupling between the coil antenna 200 and the conductive coating 300. In this example, the fractal curve 400 template is adapted in constructing the fractal slot (not shown) in the conductive coating 300 and the chassis 204 to minimize presence of the Eddy current 304.

With continuing reference to FIG. 4A, the special slot pattern or design may include a (highly magnified) first order 400-2, a second order 400-4, a third order 400-6 and an "$n^{th}$" order 400-n that is a continuous no-self loop multiple variation of the first order 400-2. In an implementation, the first order 400-2 may be defined as first order 400-2=$F^*(P_0)$ where "F" is a transformation function and $P_0$ is an initial point such as $X_0$ and $Y_0$. In this implementation, a re-generation feature of the fractal curve 400 may provide higher order that is a self-similarity of the original first order 400-2. For example, the second order 400-4 may be defined as the second order 400-2=$F^*(F^*P_0)$; the third order 400-6 may be defined as third order 400-6=$F^*(F^*(F^*P_0))$; and the $n^{th}$ order 400-n may be defined as the $n^{th}$ order 400-n=$F^{n*}P_0$.

In an implementation, the $n^{th}$ order 400-n may include an example configuration of the fractal slot (not shown) to provide high impedance to the Eddy current 304. In this implementation, the configuration of the no-self loop $n^{th}$ order 400-n itself may provide the high impedance to the Eddy current 304. In another implementation, width 402 of the no-self loop $n^{th}$ order 400-n may be dynamically adjusted (e.g., 1 mm) to obtain the same result. In an implementation, the $n^{th}$ order 400-n may be further re-generated or tiled with another $n^{th}$ order 400-n fractal curve template (i.e., another fractal slot) to cover the coil antenna 200. In other words, the fractal curve 400 may be dynamically adjusted from a lower order/smaller scale to a higher order/higher scale when used to model the size of the coil antenna 200 or at least the approximate extent of the electromagnetic field radiated by the coil antenna 200.

FIG. 4B illustrates an example fractal slot that is tiled with another fractal slot to reduce coupling between the coil antenna 200 and the conductive coating 300. In an implementation, a fractal slot 404 may include constructed slots, slices, or segments that adapt or are based from the fractal curve 400 template. For example, a single fractal slot 404 is configured to adapt the $n^{th}$ order 400-$n$ fractal curve 400 template. In this example, the fractal slot 404 may include a no-self loop fractal space filling curve shape that is constructed on the conductive coating 300 or the metal chassis 204.

In an implementation, fractal slot 404 may be constructed at each quadrant (i.e., $1^{st}$, $2^{nd}$, $3^{rd}$, and $4^{th}$ quadrant) of an area covered by the coil antenna 200 or the area defined by approximate extent of electromagnetic fields radiated by the coil antenna 200. For example a fractal slot 404-2 is constructed in the $1^{st}$ quadrant to provide high impedance to the Eddy current 304 that may be present at least in the first quadrant of area 204. In this example, fractal slots 404-4 to 404-8 may be constructed in the $2^{nd}$, $3^{rd}$, and $4^{th}$ quadrant, respectively, to provide maximum impedance to the Eddy current 304 that may be generated by the coil antenna 200.

In an implementation, the number of quadrants may provide corresponding number of grounding points 406 to maintain or increase ESD in the conductive coating 300, and also to provide rigidity of the constructed fractal slots 404 in the chassis 204. For example, ground points 406-2 and 406-4, which includes both ends of the fractal slot 404-2, are installed to connect the fractal slot 404-2 in the first quadrant to rest of the conducting coating 300. Similarly, ground points 406-6 and 406-8 are used for the second fractal slot 404-4 in the second quadrant, ground points 406-10 and 406-12 are used for the third fractal slot 404-6 in the $3^{rd}$ quadrant, etc. In these examples, the fractal slots 404 may transform the conductive coating 300 into a transparent conductive coating 300 such that the integrated coil antenna 200 may perform NFC related functions as if the conductive coating 300 is not present. In other words, the conductive coating 300 may include a low coupling coefficient such that the coil antenna 200 may be able to read the credit card 104 or the NFC tag 106 without compromising ESD protection for the conductive coating 300. For metal chassis 204, the slots 404 may be constructed to protrude from the conductive coating 300 to the metallic chassis 204.

With continuing reference to FIG. 4B, the area covered by the four quadrants may be equal to or greater than the area covered by outside perimeter of the coil antenna 200. In other implementations, a single fractal slot 404 may be used to cover the approximate extent of electromagnetic fields that may induce Eddy current 304 (see FIG. 3) to the conductive coating 300 (see FIG. 3). In this implementation, frequency selectivity of the fractal slot 404 may be further configured by adjusting the width 402, by adjusting the distance of the coil antenna 200 to the fractal slot 404, or by dynamically adjusting number of fractal slots 404 to be tiled with another fractal slot 404.

Figure 5:
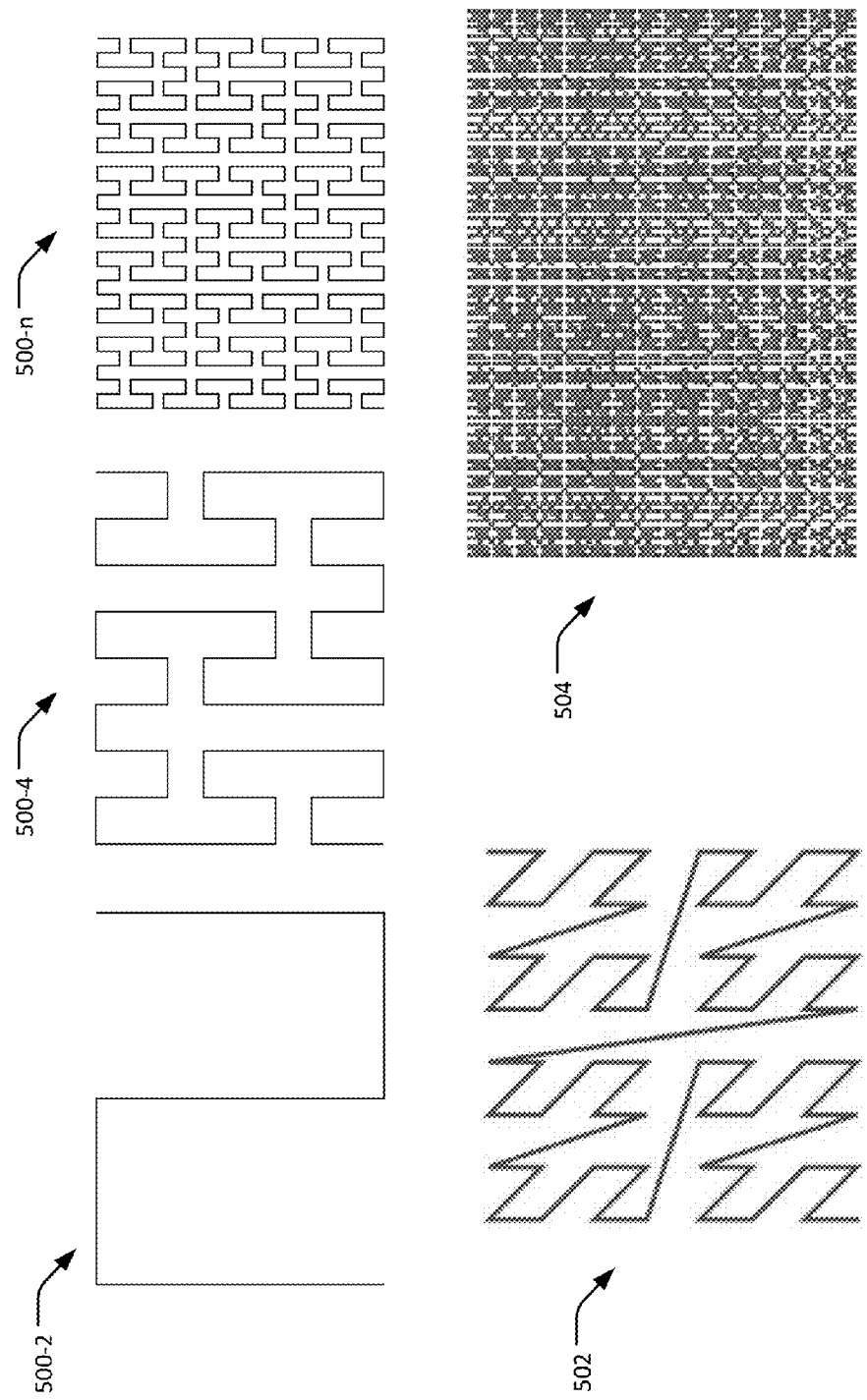
FIG. 5 illustrates alternate fractal space filling curves that avoid self loop to minimize Eddy current paths.

FIG. 5 illustrates different fractal curve 400 templates used in constructing the fractal slot 404. In an implementation, FIG. 5 shows no-self loop fractal curve 400 templates to be adapted by the fractal slot 404 that may be tiled with another fractal slot 404. For example, a Peano Curve 500 may be adapted by the single fractal slot 404 in each of the quadrants in FIG. 4B. Similarly, a Lebesque curve 502 of zero order may be re-generated to provide the template for the single fractal slot 404. Furthermore, an H-tree curve 504 may be used as the template for constructing single fractal slot 404.

Figure 6:
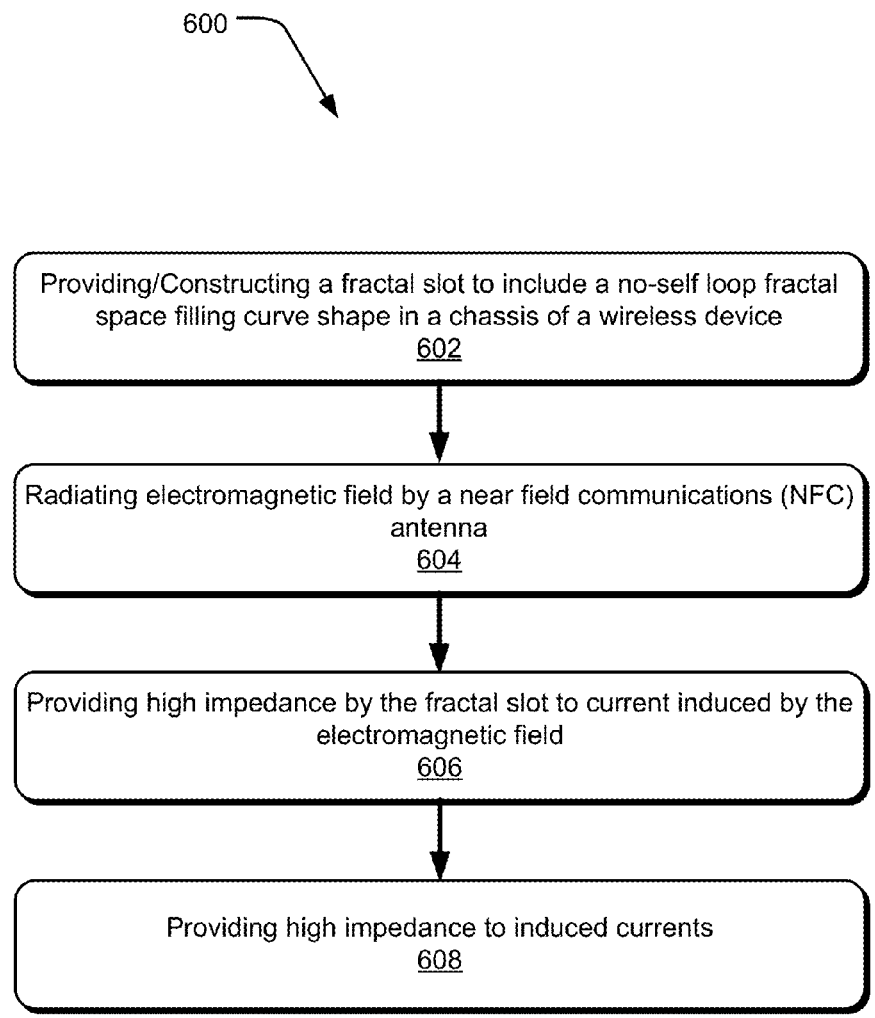
FIG. 6 is an example method to reduce induced currents in a wireless device chassis.

FIG. 6 shows an example process chart 600 illustrating an example method for reducing induced currents in a wireless device chassis. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, constructing a fractal slot to include a no-self loop fractal space filling curve shape is performed. In an implementation, the fractal slot (e.g., fractal slot 404) is provided (constructed) in a carbon-fiber or metallic chassis (e.g., chassis 204) of a portable device (e.g., portable device 102). In this implementation, the fractal slot 404 may be constructed in a conductive coating (e.g., conductive coating 300) of a plastic chassis 204, or constructed in the conductive coating 300 and extend up to full metal chassis 204 in case of Ultrabook design. In other words, the fractal slot 404 may protrude to surface of the full metal chassis 204.

In an implementation, the fractal slot 404 may adapt or is based from a fractal curve template (e.g., fractal curve 400 template). In this implementation, the no-self loop fractal curve 400 may include different orders such as a first order 400-2, a second order 400-4, . . . or $n^{th}$ order 400-$n$. The (lower) first order 400-2 may include a geometric pattern defined by a transformation function and re-generated to provide the (higher) $n^{th}$ order 400-$n$. In other words, the fractal curve 400 may include a self-similarity feature where the first order 400-2 may include a smaller scale configuration of the higher order $n^{th}$ order 400-$n$.

In an implementation, the fractal slot 404 may be tiled with another fractal slot 404 e.g., placing first fractal slot 404-2 in $1^{st}$ quadrant, second fractal slot 404-4 to $2^{nd}$ quadrant, etc. to cover the size of NFC coil antenna (e.g., coil antenna 200) or approximate extent of electromagnetic fields that may be radiated by the coil antenna 200. In other implementations, a single fractal slot 404 may be configured or designed to cover the coil antenna 200.

In an implementation, the fractal slot 404 may include grounding points (e.g., ground point 406) so as not to compromise ESD protection in the conductive coating 300 of the portable device 102. In this implementation, multiple ground points 406 may be installed in case of multiple fractal slots 404 that are tiled adjacent to each other to cover the approximate extent of electromagnetic fields generated by the coil antenna 200.

At block 606, radiating the electromagnetic field by the coil antenna is performed. In an implementation, the coil antenna 200 may be embedded directly underneath the conductive coating 300. The conductive coating 300 may be integrated to the chassis 204 of the portable device 102. In an implementation, the coil antenna 200 may radiate the electromagnetic field during NFC related operations.

At block 608, providing high impedance to induced currents is performed. In an implementation, the fractal slot 404 may be configured to provide the high impedance for the induced currents (e.g., Eddy current 304). For example, the geometric pattern for the fractal slot 404 may be configured to minimize coupling between the coil antenna 200 and the conductive coating 300. In this example, the coupling minimization may provide the high impedance to the Eddy current 304 and as such, increases field strength of the coil antenna 200. Furthermore, fractal slot 404 width (e.g., width 402) may be adjusted to provide the high impedance. In other implementations, the fractal slot 404 may be configured to be frequency selective through adjustment of the width 402, dynamic adjustment of the transformation function that defines the geometric pattern, or adjustment of distance between the coil antenna and the fractal slot 404.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Figure 7:
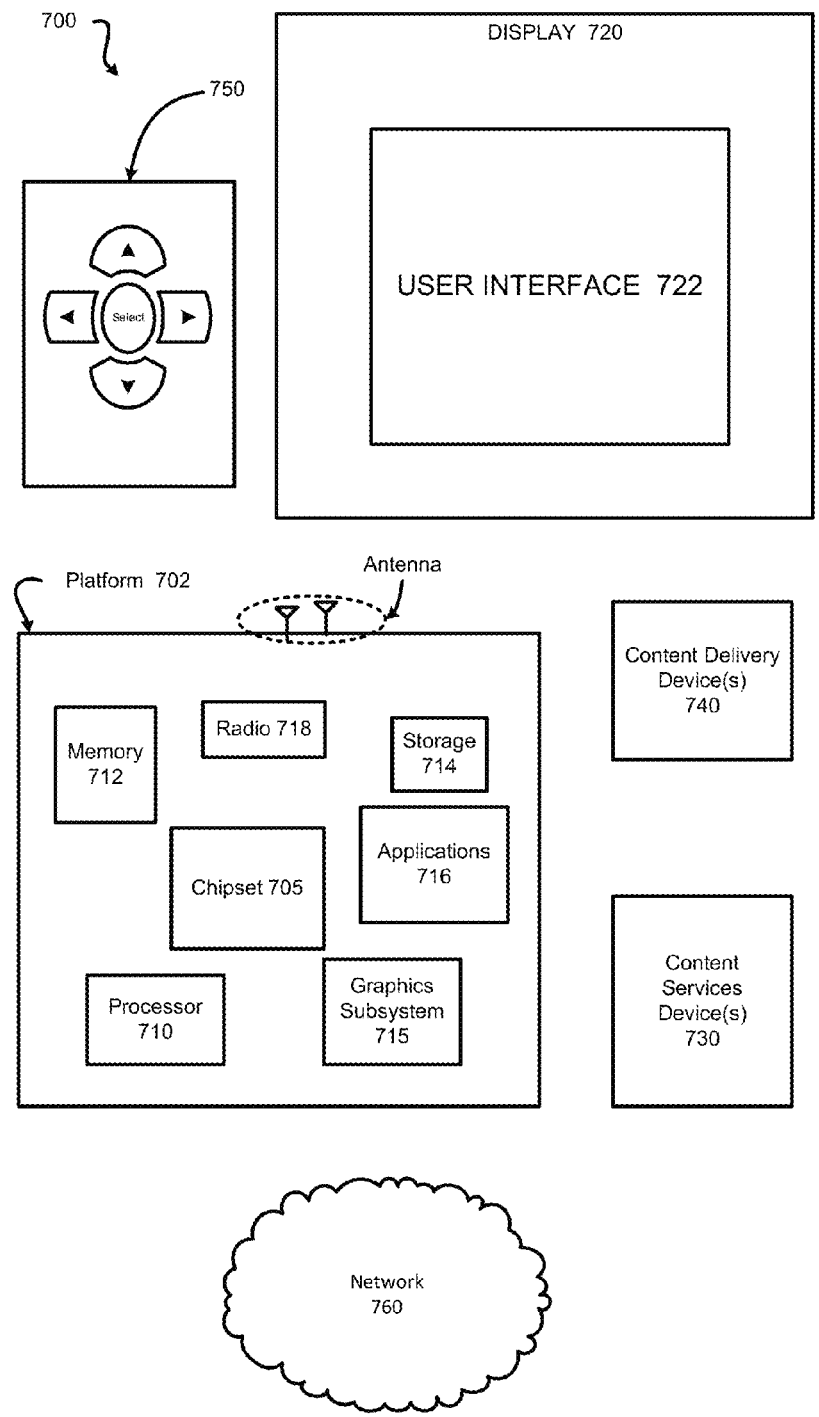
FIG. 7 illustrates an example system device to implement near field communications (NFC) related functions.

FIG. 7 illustrates an example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

As described above, system 700 may be embodied in varying physical styles or form factors. FIG. 7 illustrates implementations of a small form factor device 700 in which system 700 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 8:
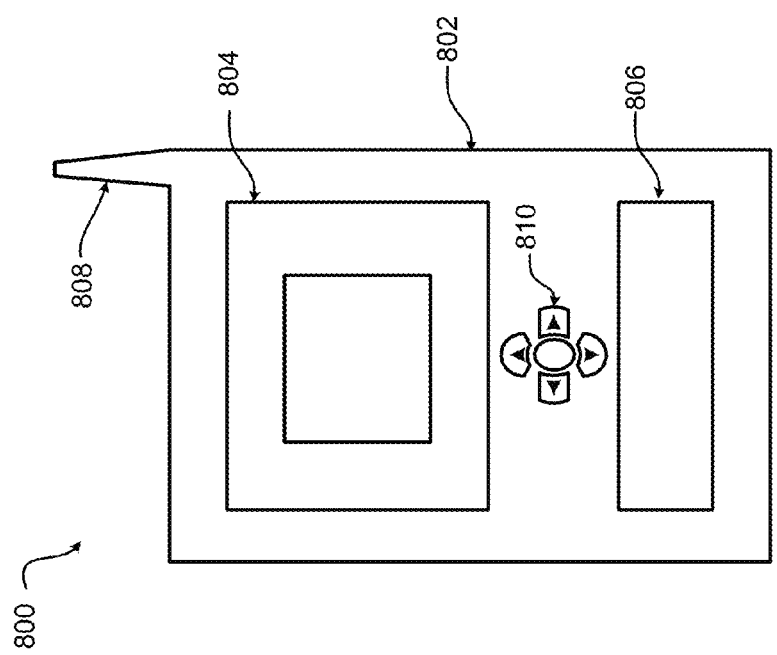
FIG. 8 illustrates an example device to implement near field communications (NFC) related functions.

As shown in FIG. 8, device 800 may include a housing 802 (i.e., chassis 204), a display 804, an input/output (I/O) device 806, and an antenna 808. Device 800 also may include navigation features 810. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An apparatus comprising:
one or more processors;
a memory coupled to the one or more processors;
a near field communications (NFC) antenna coupled to the one or more processors wherein the NFC antenna includes a continuous multiple loop of coil that is integrated underneath a metal chassis of the apparatus; and
a conductive coating that is disposed in between the NFC antenna and the metal chassis, wherein at least one continuous fractal slot is constructed on the conductive coating and the metal chassis, wherein a direction of sliced slots or segments of the at least one continuous fractal slot is configured to be perpendicular to an assumed direction of an induced current on the conductive coating, wherein the assumed direction of the induced current on the conductive coating is opposite to a direction of an injected current on the continuous multiple loop of coil of the NFC antenna.

2. The apparatus as recited in claim 1, wherein the at least one continuous fractal slot defines an area that covers at least a perimeter of an outermost coil of the continuous multiple loop coil of the NFC antenna.

3. The apparatus as recited in claim 1, wherein the at least one continuous fractal slot is a no-self loop fractal space filling curve template that includes a Hilbert Curve, a Peano Curve, a Lebesque Curve, or an H-tree curve.

4. The apparatus as recited in claim 1, wherein the continuous multiple loop of coil forms a rectangular ring shaped—NFC antenna.

5. The apparatus as recited in claim 4, wherein the assumed direction of the induced current on the conductive coating follows a pattern of the continuous multiple loop of coil of the rectangular ring shape—NFC antenna.

6. The apparatus as recited in claim 1, wherein the sliced slots or segments form a geometric pattern configured to cut continuity of the induced current on the conductive coating.

7. The apparatus as recited in claim 1, wherein the continuous fractal slot is tiled into different quadrants of an area covering an approximate extent of electromagnetic fields that induce Eddy current to the conductive coating.

8. The apparatus as recited in claim 1, wherein the at least one continuous fractal slot includes an adjustable width to provide high impedance to Eddy current and frequency selectivity when the NFC antenna is operating in wireless fidelity (WiFi) signal frequency.

9. A method of reducing induced currents in an apparatus chassis comprising:

constructing a fractal slot on a conductive coating and the apparatus chassis, wherein a direction of sliced slots or segments of the fractal slot is configured to be perpendicular to an assumed direction of an induced current on the conductive coating, wherein the assumed direction of the induced current on the conductive coating is opposite to a direction of an injected current on a continuous multiple loop of coil of an near field communications (NFC) antenna, wherein the conductive coating is disposed in between the NFC antenna and the apparatus chassis;

radiating an electromagnetic field by the NFC antenna; and providing high impedance to the currents induced by the electromagnetic field.

10. The method in claim 9, wherein the sliced slots or segments of the fractal slot is constructed on a metallic chassis or carbon-fiber chassis.

11. The method in claim 9, wherein the fractal slot defines an area that covers at least a perimeter of an outermost coil of the continuous multiple loop coil of the NFC antenna.

12. The method in claim 9, wherein the sliced slots or segments form a geometric pattern configured to cut continuity of the induced current on the conductive coating.

13. The method in claim 9, wherein the sliced slots or segments of the fractal slot include an adjustable width to provide a high impedance to the induced currents and to provide frequency selectivity when the NFC antenna is operating in a wireless fidelity (WiFi) signal frequency.

14. The method in claim 9, wherein the continuous multiple loop of coil forms a rectangular ring shaped—NFC antenna.

15. The method in claim 14, wherein the assumed direction of the induced current on the conductive coating follows a pattern of the continuous multiple loop of coil of the rectangular ring shape—NFC antenna.

16. The method in claim 9, wherein the fractal slot is tiled with another fractal slot to cover an area that includes approximate extent of an electromagnetic field that induces Eddy current to the conductive coating.

17. The method in claim 9, wherein the fractal slot is a no-self loop fractal space filling curve shape that includes a Hilbert Curve, a Peano Curve, a Lebesque Curve, or an H-tree curve.

18. The method in claim 9, wherein the induced current is an Eddy current that flows in opposite direction to the injected current in the NFC antenna.

* * * * *